United States Patent [19]

Griffin

[11] 4,035,098
[45] July 12, 1977

[54] QUICK RELEASE, SELF CENTERING, POWER TRANSFER ASSEMBLY

[76] Inventor: Herman Clyde Griffin, Rte. No. 2, Box 108, Ocilla, Ga. 31774

[21] Appl. No.: 599,927

[22] Filed: July 28, 1975

[51] Int. Cl.² ......................................... F16B 21/10
[52] U.S. Cl. ............................... 403/356; 403/362
[58] Field of Search .................. 403/362, 356, 318

[56] References Cited

U.S. PATENT DOCUMENTS

| | | | |
|---|---|---|---|
| 1,422,598 | 7/1922 | Misenheimer | 403/362 |
| 2,341,191 | 2/1944 | Orendorff | 403/362 |
| 2,693,255 | 11/1954 | Dicke et al. | 403/362 |
| 2,933,934 | 4/1960 | Haroldson | 403/362 |

FOREIGN PATENT DOCUMENTS

| | | | |
|---|---|---|---|
| 826,381 | 1/1952 | Germany | 403/362 |
| 342,564 | 2/1931 | United Kingdom | 403/362 |

*Primary Examiner*—Andrew V. Kundrat
*Attorney, Agent, or Firm*—Newton, Hopkins & Ormsby

[57] ABSTRACT

A power transfer assembly having a hub and a circular transfer member provided with a common central axis. A central bore extends along the axis, being defined by opposed, different diameter, concentric inner peripheral surfaces of the central portion. A cylindrical shaft is cradled on one side by the smaller diameter surface and is urged into its cradled condition by spaced radial locking bolts with jam nuts. The smaller diameter surface has a keyway aligned axially with the keyway of the shaft, the two keyways sharing a common key.

2 Claims, 4 Drawing Figures

QUICK RELEASE, SELF CENTERING, POWER TRANSFER ASSEMBLY

BACKGROUND OF THE INVENTION

1. Field of the Invention

This invention relates to a quick release, self-centering power transfer assembly and is more particularly concerned with a gear, sprocket or pulley provided with a quickly removable and self-centering hub which receives a shaft.

2. Description of the Prior Art

In the past, hubs for sprockets, pulleys, sheaves and gears have usually consisted of simply a cylindrical body secured to the pulley, sheave, sprocket or gear in coaxial relationship therewith. The bore of the hub has usually been of approximately the same diameter as of the shaft on which the hub is mounted, the bore being provided with a keyway for receiving a key when a key slot is aligned with the keyway of the hub. Once installed, the hub is usually firmly in place, even though set screws are utilized for locking the hub in place on the shaft.

After this prior art assembly has been in use for any appreciable length of time, the hub is perhaps rusted or corroded and is usually firmly fixed on the shaft, requiring considerable time and effort in order to be removed therefrom. Indeed, at times, it is impossible to remove a pulley, sheave, gear or sprocket, i.e., the circular power transfer member, from the shaft without damaging or destroying one or the other. This is particularly true with farm equipment, which is subjected to unusual weathering conditions and to the corrosive effects of fertilizer.

The present invention is believed to obviate the problems described above by providing a readily and easily removable self centering sprocket, gear, pulley or sheave.

SUMMARY OF THE INVENTION

Briefly described, the present invention includes a circular rotatable power transfer member which is a sheave, pulley, sprocket or gear provided with a cylindrical hub, the inner periphery of which has concentric opposing different diameter peripheries. The smaller periphery snugly receives a side portion of the shaft and the key for locking the shaft to the hub. The larger diameter peripherial portion receives a plurality of lock screws or bolts which are circumferentially spaced from each other and project radially toward the shaft so as to urge the shaft into a firm seating in the smaller periphery of the hub.

DESCRIPTION OF THE PREFERRED EMBODIMENT

Figure 1:
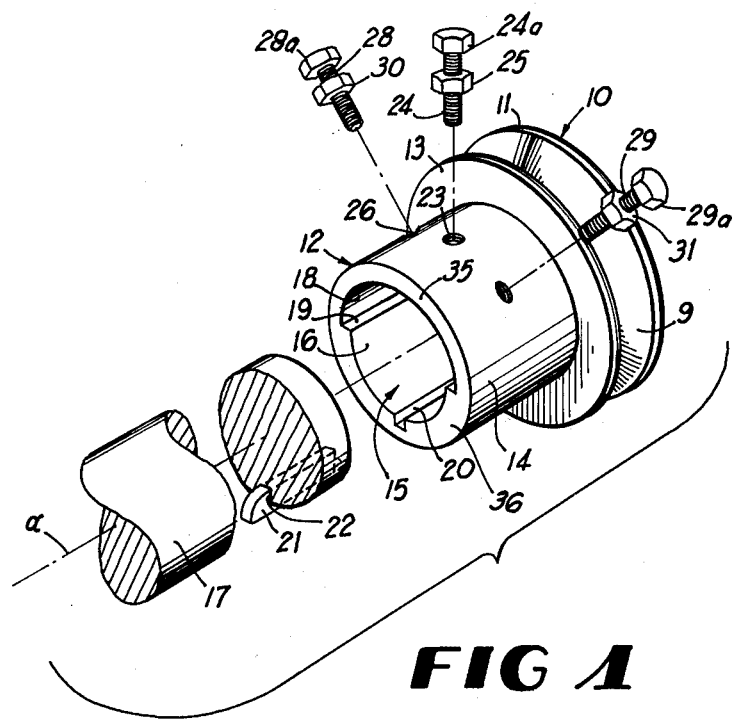
FIG. 1 is an exploded, fragmentary perspective view of a power transfer assembly constructed in accordance with the present invention and installed on the end of a shaft.

Referring now in detail to the embodiments chosen for the purpose of illustrating the present invention, numeral 10 in FIG. 1 denotes a circular rotatable power transfer assembly which consists of a pulley or sheave 11 having a continuous groove 9 along its periphery and a hub 12 secured to one side in coaxial or concentric relationship. The hub 12 is integrally formed with the sheave or pulley 11 and protrudes sidewise from the inner surface 13 of the pulley or sheave 11. The hub 12 has a cylindrical outer periphery or surface 14 and a central bore or shaft receiving passageway 15. The passageway 15 extends along axis $a$ throughout the hub 12 and normally projects through the pulley or sheave 11.

According to the present invention, the bore 15 is defined by a central portion having a concaved, smaller diameter periphery or inner surface 16 along approximately 180°. This arcuate, inner periphery or surface 16 conforms to the contour of one side of shaft 17, being approximately equal to or slightly larger than the diameter of shaft 17 on which the hub assembly 10 is to be mounted. The remainder of the inner surface, defining bore 15, is also arcuate, so as to present a peripheral surface 18 which is radially opposed to the periphery or surface 16, and is, itself, of larger diameter than the diameter of periphery 16. At the junction of the periphery 16 and 18, there are a pair of radial shoulders 19 which are diametrically opposed to each other and join the ends of the semi-circular 180° smaller periphery 16 and the ends of the semi-circular 180° larger periphery 18, as shown in FIG. 1. It is now seen that the inner surfaces 16 and 18 are concentric with each other, being concentric about the central axis $a$ of the assembly 10.

A keyway 20 is disposed axially throughout the length of the smaller periphery 16. This keyway 20 forms a U-shaped recess or trough which receives the outer half of right prism key 21. Preferably the keyway 20 is circumferentially midway between the shoulders 19. A similar keyway 22 is provided in the side of shaft 17 so as to receive the inner portion of key 21 and when the key 21 is received in the key way 20. This serves as a means for rotationally locking the assembly 10 to shaft 17.

Diametrically opposed to the keyway 20 is a radial hole 23 extending through hub 12 and through surface 18. The wall, which defines hole 23, is internally threaded so as to receive the external threads of a lock bolt or screw 24. Lock bolt or screw 24 is provided at its distal end with a head 24a and at an intermediate portion with a jam nut 25 for locking the bolt 24 in place when it has been screwed down sufficiently through the hole 23 that their ends engage the side of shaft 17.

Figure 2:
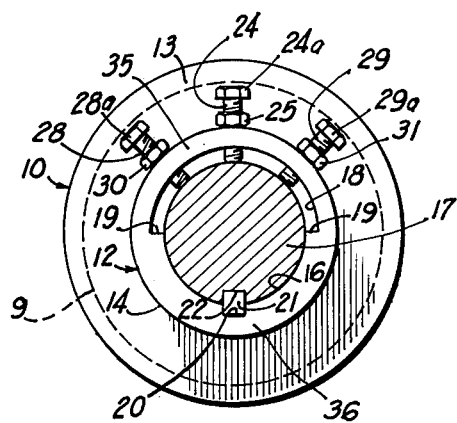
FIG. 2 is a side elevational view of the assembly disclosed in FIG. 1, the shaft being shown in cross-section.

Circumferentially spaced approximately 45° on opposite sides of the hole 23 are additional radial holes 26 and 27, respectively in hub 12. These holes 26 and 27 respectively threadedly receive radially extending bolts 28 and 29, these bolts being provided, respectively, with heads 28a and 29a and jam nuts 30 and 31. As seen in FIG. 2., the distal ends of radial bolts 24, 28 and 29 terminate a like distance from axis $a$, the axes of bolts 24, 28 and 29 being disposed in a common radial plane.

When the hub assembly 10 is mounted on the end of shaft 17, the bolts 24, 28 and 29 are tightened against the one side of the shaft 17 so as to urge the shaft, as depicted in FIG. 2, into a cradled condition, snugly received by the smaller periphery or surface 16 so as to position the hub 12 concentrically on the end of shaft 17. The keyways 20 and 22 are aligned axially and receive the key 21, as illustrated in FIG. 2. When the bolts 24, 28 and 29 have been tightened sufficiently, the jam nuts 29, 30 and 31 are then tightened in place so as to lock the bolts in position and so as to lock the hub 12 firmly in place concentrically on the shaft 17.

When it is desired to remove the assembly 10 from the shaft 17, the nuts 25, 30, and 31 are loosened and then the bolt 24, 28 and 29 are, likewise, loosened so that their proximal ends no longer bear upon the one side of the shaft 17. Thereafter, a mallet, hammer or other heavy instrument can be tapped against the hub 14 or against the bolts, such as bolt 24, so as to free the other side portion of shaft 17 from the smaller periphery 16 of the hub 12. This, of course, frees the hub 14 and the pulley 11 from the shaft 17 so that shaft 17 is asymetrically disposed in hub 12 and is, hence, loosely in bore 15 and can be quite easily and readily removed, therefrom.

Preferably, when the assembly 10 is installed on shaft 17, as depicted in FIG. 2, the distance between the larger diameter periphery or surface 18 and the adjacent side of shaft 17 is greater than the depth of either keyway 20 or keyway 22 so that, when the bolts 24, 28 and 29 are totally retracted, the hub 12 and the shaft 17 can be totally disengaged from each other and so that one may rotate with respect to the other without interference from the key 21.

As best seen in FIG. 2, the thickness of the bolt carrying portion 35 of hub 12 is substantially less than the thickness of the shaft cradling portion 36 of hub 12 and, therefore, the bolt carrying portion 35 weighs substantially less than the shaft cradling portion 36. Nevertheless, due to the weight of radial bolts 24, 28 and 29 and their lock nuts 25, 30 and 31, and their distribution they offset this weight difference to balance the hub 12.

Figure 3:
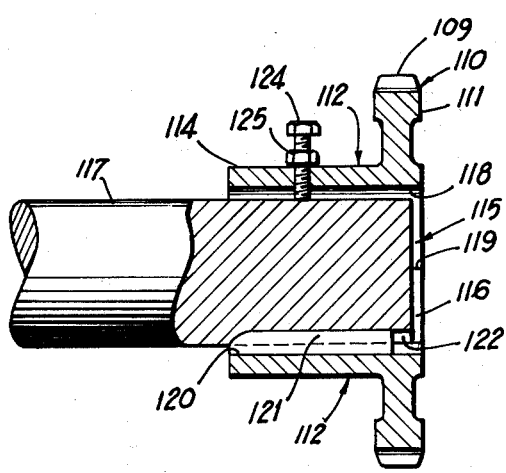
FIG. 3 is a vertical sectional view of a second embodiment of the present invention.

In FIG. 3 a second embodiment is illustrated in which a power transfer assembly 110 includes a circular gear 111 provided with radially outwardly protruding, equally spaced, teeth 109. The hub 112 is identical to the hub 12 and both the gear 111 and the hub 112 are provided with a central bore 115 which includes the small diameter periphery or surface 116 and the large diameter periphery or surface 118 in diametric opposition to each other, the same being joined by peripheral shoulders 119. The surface 116 has a keyway 120 which receives a key 121 riding in a keyway 122 in the shaft 117 which is received with the bore 115. Hub 112 has an outer periphery 114.

Lock bolts, such as bolt 124, provided with a jam nut 125, protrude through the central portion of the hub 112 so as to urge the shaft 117 into concentric seating arrangement in the smaller periphery 116. Additional lock bolts (not shown) are provided, if desired.

The removal of the hub assembly 110 is identical to the removal of the hub 10 and, hence no description of its removal is included.

Figure 4:
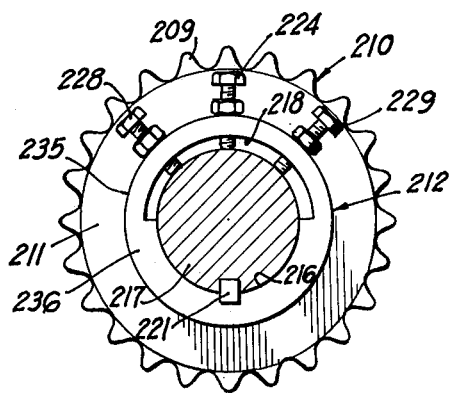
FIG. 4 is a side elevational view of a third embodiment of the present invention, the shaft again being shown in cross-section.

FIG. 4 depicts a third embodiment of the present invention in which the power transfer member 210 includes a sprocket 211 provided with equally spaced outwardly protruding teeth or fingers 209 along its periphery. The hub 212 of assembly 210 is identical to the hubs 12 and 112 and include a plurality of bolts 224, 228 and 229 corresponding to the bolts 24, 28 and 29. These bolts 24, 28, 29 project radially through the larger diameter, bolt carrying portion 235 so as to urge the shaft 217 into seating coaxial registry with the smaller diameter cradle or surface 216 of cradle portion 236 opposite the bolts 24, 28 and 29. The shaft 217 is keyed by key 221 to the hub 212 in the manner in which the shaft 17 is keyed to hub 12. The shaft 217 is installed or removed from the hub 212 in identically the same manner as the hub 12 is removed from the shaft 17.

From the foregoing description, it is apparent that the present invention provides a quite ready means of removing a power transfer member from a shaft, even though the shaft and the hub are quite rusted or corroded. However, the shaft 17, 117 or 217 is quite firmly held in axial alignment along axis α, when bolts 24, 28, 29, 124, 128, 129 or 224, 228, 229 are tightened against the side of the shaft so as to function as a means for releasibly urging or forcing the shaft 17, 117 or 217 radially toward and into registry and coaxial alignment with its cradling surfaces 16, 116 or 216. When bolts are loosened, only mild taping on hub 12, 112 or 212 will usually displace the shaft 17, 117 or 217 toward larger radius surface 18, 118 or 218. The continuous groove 9, teeth 109 and fingers 209 provide means on the periphery of the member 11, 111, 211, by which power is transferred from the shaft 17, 117 or 217.

What is claimed is:

1. A power transfer assembly, for transferring power from a shaft to the periphery of said assembly, comprising:
   a. a cylindrical shaft having a central axis and an end, said shaft having a first recess;
   b. a circular rotatable power transfer member having a central axis and being positioned axially outwardly of said shaft beyond said end of said shaft so as to overlap the end thereof;
   c. means on the periphery portion of said member by which power is transferred when the member is rotated;
   d. a hub secured to and protruding sideways from said power transfer member for rotation therewith, said hub having a pair of opposed inside surfaces defining a central bore for receiving said shaft, one of said inside surfaces being concave, defining a first arc and forming a cradle conforming to the contour of one side portion of said shaft for snugly receiving said one side portion, said one of said inside surfaces having a second recess therein, the other of said inside surfaces being concave and defining a second arc, said first arc being concentric about said central axis of said member, the radius of said first arc being about equal to the radius of said shaft, the radius of said second arc being greater than the radius of said shaft by a spacing distance and said hub defining an exteriorly accessible threaded aperture through said other inside surface;
   e. a set screw of sufficient length to pass through said aperture and traverse said spacing distance, for engaging said shaft opposite said one side and forcing said one side of said shaft against said one inside surface with the central axis of said shaft aligned with the central axis of said member;

f. a key in said first recess and said second recess diametrically opposed to said threaded aperture to prevent rotation of said shaft within said hub when said one side of said shaft is abutting said one inside surface of said hub and said threaded aperture being located axially along said hub such that its axis intersects the key approximately midway thereof when said power transfer member overlaps the end of said shaft; and g. additional set screws circumferentially spaced substantially equally on opposite sides of said set screw, said hub defining a plurality of apertures circumferentially spaced and passing through said other inside surface for receiving said additional set screws to engage said shaft opposite said one side and force said one side of said shaft against said one inside surface.

2. The power transfer assembly defined in claim 1 wherein said one inside surface extends through approximately one-half of the circumference of said bore, said other inside surface extends through approximately one-half of the circumference of said bore, and said apertures are equally spaced circumferentially on said other inside surface.

* * * * *